(12) United States Patent
Arakawa et al.

(10) Patent No.: US 10,894,880 B2
(45) Date of Patent: Jan. 19, 2021

(54) RUBBER COMPOSITIONS AND METHODS OF PRODUCING RUBBER COMPOSITIONS

(71) Applicants: TOYODA GOSEI CO., LTD., Kiyosu (JP); OSAKA GAS CO., LTD., Osaka (JP)

(72) Inventors: Yuta Arakawa, Kiyosu (JP); Yasuhiro Yamaguchi, Kiyosu (JP); Hidekazu Kurimoto, Kiyosu (JP); Masahiro Yamada, Osaka (JP); Hiroki Sakamoto, Osaka (JP)

(73) Assignees: TOYODA GOSEI CO., LTD., Aichi-pref. (JP); OSAKA GAS CO., LTD., Osaka (JP)

( * ) Notice: Subject to any disclaimer, the term of this patent is extended or adjusted under 35 U.S.C. 154(b) by 53 days.

(21) Appl. No.: 16/361,952

(22) Filed: Mar. 22, 2019

(65) Prior Publication Data

US 2019/0300689 A1    Oct. 3, 2019

(30) Foreign Application Priority Data

Mar. 30, 2018  (JP) ................. 2018-066803
Mar. 30, 2018  (JP) ................. 2018-066804
Mar. 8, 2019   (JP) ................. 2019-042395

(51) Int. Cl.

| | |
|---|---|
| C08L 23/16 | (2006.01) |
| C08K 3/06 | (2006.01) |
| C08L 11/00 | (2006.01) |
| C08L 13/00 | (2006.01) |
| C08L 1/02 | (2006.01) |
| C08K 3/013 | (2018.01) |
| C08K 7/02 | (2006.01) |
| C08K 3/34 | (2006.01) |
| C08J 3/24 | (2006.01) |
| C08K 3/04 | (2006.01) |

(52) U.S. Cl.
CPC .............. *C08L 23/16* (2013.01); *C08J 3/242* (2013.01); *C08K 3/013* (2018.01); *C08K 3/041* (2017.05); *C08K 3/042* (2017.05); *C08K 3/06* (2013.01); *C08K 3/346* (2013.01); *C08K 7/02* (2013.01); *C08L 1/02* (2013.01); *C08L 11/00* (2013.01); *C08L 13/00* (2013.01); *C08J 2323/16* (2013.01); *C08J 2401/02* (2013.01); *C08J 2411/00* (2013.01); *C08J 2413/00* (2013.01); *C08K 2201/003* (2013.01); *C08K 2201/011* (2013.01); *C08L 2205/035* (2013.01)

(58) Field of Classification Search
CPC .. C08L 23/16; C08L 1/02; C08L 11/00; C08L 13/00; C08L 2205/035; C08K 3/041; C08K 3/042; C08K 3/013; C08K 7/02; C08K 2201/003; C08K 2201/011; C08J 3/242; C08J 3/06; C08J 3/346; C08J 2323/16; C08J 2401/02; C08J 2411/00; C08J 2413/00
USPC .......................................................... 524/32
See application file for complete search history.

(56) References Cited

U.S. PATENT DOCUMENTS

2010/0173146 A1 * 7/2010 Ihara ................. B32B 27/20
428/323

FOREIGN PATENT DOCUMENTS

| JP | 2005-282449 A | 10/2005 |
| JP | 2014-105217 A | 6/2014 |
| JP | 5940192 B1 | 6/2016 |
| JP | 2016-222745 A | 12/2016 |
| JP | 2017-008157 A | 1/2017 |
| JP | 2017-222777 A | 12/2017 |

* cited by examiner

*Primary Examiner* — William K Cheung
(74) *Attorney, Agent, or Firm* — Posz Law Group, PLC

(57) ABSTRACT

A rubber composition contains: at least one rubber component selected from the group consisting of an ethylene propylene diene rubber, a chloroprene rubber, a nitrile rubber, and an acrylic rubber; 1.5 to 30 parts by mass of a fluorene-modified cellulose nanofiber per 100 parts by mass of the rubber component; and 30 to 120 parts by mass of a carbon-based filler per 100 parts by mass of the rubber component. A method of producing a rubber composition comprises: kneading a dispersion of a fluorene-modified cellulose nanofiber in a process oil and a rubber component to prepare a kneaded material; and mixing a vulcanizing agent into the kneaded material.

12 Claims, No Drawings

RUBBER COMPOSITIONS AND METHODS OF PRODUCING RUBBER COMPOSITIONS

1. FIELD

The following description relates to rubber compositions and methods of producing rubber compositions.

2. DESCRIPTION OF RELATED ART

Japanese Patent No. 5940192 discloses a technique for improving abrasion resistance and mechanical strength of a rubber composition by adding a cellulose nanofiber to the rubber composition.

Japanese Patent Application Laid-open No. 2017-222777 discloses a fluorene-modified cellulose nanofiber produced by grafting a polymerizable fluorene compound to a cellulose nanofiber to improve the compatibility and dispersibility in an organic medium such as a resin.

Japanese Patent Application Laid-open No. 2005-282449 discloses an air cleaner hose formed of a rubber composition. The hose is disposed in an intake system of a vehicle engine.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a rubber composition comprises: at least one rubber component selected from the group consisting of an ethylene propylene diene rubber, a chloroprene rubber, a nitrile rubber, and an acrylic rubber; 1.5 to 30 parts by mass of a fluorene-modified cellulose nanofiber per 100 parts by mass of the rubber component; and 30 to 120 parts by mass of a carbon-based filler per 100 parts by mass of the rubber component.

In another general aspect, a method of producing a rubber composition comprises: kneading a dispersion of a fluorene-modified cellulose nanofiber in a process oil and a rubber component to prepare a kneaded material; and mixing a vulcanizing agent into the kneaded material.

Other features and aspects will be apparent from the following detailed description and the claims.

DETAILED DESCRIPTION

This description provides a comprehensive understanding of the methods, compositions, and/or systems described. Modifications and equivalents of the methods, compositions, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

I. Rubber Composition

Hereinafter, embodiments of the rubber composition will be described.

The rubber composition is applied to, for example, a molded rubber product such as a vehicle part that is required to have both sufficient stiffness and elongation properties. Examples of a molding method of the rubber composition include extrusion, injection molding, and press forming. Examples of the vehicle part that is required to have both sufficient stiffness and elongation properties include a hose such as an air cleaner hose, a brake hose, a reservoir hose and a water hose, and a weather strip.

According to embodiments, the rubber composition contains a rubber component, a fluorene-modified cellulose nanofiber, and a carbon-based filler.

<Rubber Component>

The rubber component is vulcanized rubber and is at least one selected from an ethylene propylene diene rubber, a chloroprene rubber, a nitrile rubber, and an acrylic rubber.

An ethylene propylene diene rubber is not particularly limited, and any known ethylene propylene diene rubber may be used. Examples of the diene component of the ethylene propylene diene rubber include 5-ethylidene-2-norbornene, 1,4-hexadiene, and dicyclopentadiene. The content of ethylene in the ethylene propylene diene rubber is, for example, 50 to 70% by mass. The content of the diene component in the ethylene propylene diene rubber is, for example, 4.0% by mass or more.

The chloroprene rubber is not particularly limited, and any known chloroprene rubber may be used.

The nitrile rubber is not particularly limited, and any known nitrile rubber may be used.

The acrylic rubber is not particularly limited, and any known acrylic rubber may be used. Examples of the known acrylic rubber include those made from: one or more acrylic ester monomers selected from acrylic acid alkyl ester such as methyl acrylate, ethyl acrylate, n-propyl acrylate, n-butyl acrylate, isobutyl acrylate, n-pentyl acrylate, isoamyl acrylate, n-hexyl acrylate or n-octyl acrylate, and alkoxyalkyl acrylate ester such as 2-methoxyethyl acrylate, 2-ethoxyethyl acrylate, 3-methoxypropyl acrylate or 2-methoxypropyl acrylate; and a chlorine-based monomer such as 2-chloroethyl vinyl ether and vinyl chloroacetate, an epoxy-based monomer such as allyl glycidyl ether, or a diene-based monomer such as 5-ethylidene-2-norbornene (ENB).

These rubber components may be used alone or in combinations of two or more.

<Fluorene-Modified Cellulose Nanofiber>

The fluorene-modified cellulose nanofiber is, for example, a cellulose fiber modified with a compound having a 9,9-bisarylfluorene skeleton grafted thereto as a polymerizable monomer.

The cellulose fiber constituting the fluorene-modified cellulose nanofiber is, for example, a cellulose nanofiber obtained by pulverizing (microfibrillating) pulp. The pulp serving as a raw material of the cellulose fiber is not particularly limited, but pulp containing less non-cellulose components such as lignin and hemicellulose is preferable. The pulp may also be a mechanically treated pulp material or a chemically treated pulp material.

The polymerizable monomer grafted to the cellulose fiber is a compound having a 9,9-bisarylfluorene skeleton represented by the following general formula (1):

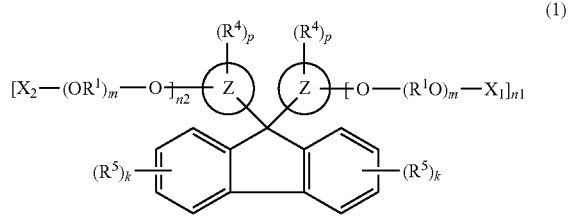

(1)

In the general formula (1), the ring Z is an arene ring.

Examples of the arene ring represented by the ring Z include a monocyclic arene ring such as benzene ring and a polycyclic arene ring, and the polycyclic arene ring includes a condensed polycyclic arene ring (condensed polycyclic hydrocarbon group) and a ring assembly arene ring (ring assembly aromatic hydrocarbon group).

Examples of the condensed polycyclic arene ring include a condensed di- to tetracyclic arene ring such as a fused bicyclic arene (for example, fused bicyclic $C_{10-16}$ arene such as naphthalene) ring and a fused tricyclic arene (for example, anthracene and phenanthrene) ring. Preferable examples of the condensed polycyclic arene ring include a naphthalene ring and an anthracene ring, and a naphthalene ring is particularly preferable. The two rings Z may be the same or different.

Examples of the ring assembly arene ring include a biarene ring, for example, bi $C_{6-12}$ arene ring such as a biphenyl ring, a binaphthyl ring, and a phenylnaphthalene ring (1-phenylnaphthalene ring, 2-phenylnaphthalene ring, and the like) and a terarene ring, for example, a ter $C_{6-12}$ arene ring such as a terphenylene ring. Preferable examples of the ring assembly arene ring include a bi $C_{6-10}$ arene ring, particularly a biphenyl ring.

In the general formula (1), $R^1$ is an alkylene group.

The alkylene group $R^1$ includes a linear or branched alkylene group: examples of the linear alkylene group include a $C_{2-6}$ alkylene group such as an ethylene group, a trimethylene group, and a tetramethylene group (preferably a linear $C_{2-4}$ alkylene group and more preferably a linear $C_{2-3}$ alkylene group, particularly an ethylene group); and examples of the branched alkylene group include a branched $C_{3-6}$ alkylene group such as a propylene group, a 1,2-butanediyl group, and a 1,3-butanediyl group (preferably a branched $C_{3-4}$ alkylene group, particularly a propylene group). When m is an integer of 2 or more, the alkylene groups $R^1$ may be the same or different. The alkylene groups $R^1$ may be the same or different in the same or different rings Z.

In the general formula (1), m indicates the number of an oxyalkylene group $(OR^1)$ and is an integer of 0, 1, or more.

The number m of the oxyalkylene group $(OR^1)$ may be selected from the range of about 0 to 20 (for example, 0 to 15): for example, 0 to 10 (for example, 1 to 8), preferably 0 to 5 (for example, 1 to 5), and more preferably 0 to 4 (for example, 1 to 4), and particularly, it may be an integer of about 0 to 3 (for example, 1 to 3) and typically may be an integer of 0 to 2 (for example, 0 or 1).

In the general formula (1), $X_1$ and $X_2$ are a radical polymerizable group or a hydrogen atom. At least one of $X_1$ and $X_2$ is a radical polymerizable group.

The radical polymerizable groups $X_1$ and $X_2$ may be the same or different, and may be an allyl group represented by the following general formula (2a), a (meth)acryloyl group represented by the following general formula (2b), or a group represented by the following general formula (2c).

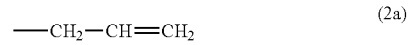

(2a)

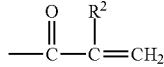

(2b)

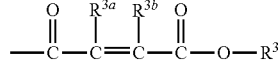

(2c)

In the general formula (2b), $R^2$ is a hydrogen atom or a methyl group. In the general formula (2c), $R^{3a}$ and $R^{3b}$ are each independently a hydrogen atom or an alkyl group, and $R^3$ is a hydrogen atom or an alkyl group.

Examples of the alkyl group represented by $R^{3a}$, $R^{3b}$, and $R^3$ include a linear or branched $C_{1-6}$ alkyl group (preferably $C_{1-4}$ alkyl group) such as a methyl group, an ethyl group, an isopropyl group, a butyl group, and a t-butyl group. In one preferable example, both $R^{3a}$ and $R^{3b}$ are hydrogen atoms or one of $R^{3a}$ and $R^{3b}$ is a hydrogen atom and the other is an alkyl group (particularly a methyl group).

Fluorene compounds having such polymerizable groups $X_1$ and $X_2$ may be used alone or in combinations of two or more. Preferable polymerizable groups $X_1$ and $X_2$ include a polymerizable group derived from a polyvalent carboxylic acid having polymerizable unsaturated double bond or a reactive derivative thereof, for example, a polymerizable group represented by the general formula (2c). In this case, grafting reaction with cellulose fiber can introduce active carboxyl or alkoxycarbonyl groups in modified cellulose fiber. Some of the carboxyl or alkoxycarbonyl groups may react with the hydroxyl groups of cellulose fiber.

In the general formula (1), n1 and n2 indicate the number of substitution of the group $[X—(OR^1)m-]$ (X represents $X_1$ or $X_2$; the same applies hereinafter). Each of n1 and n2 is an integer of 0, 1, or more (for example, an integer of 0 to 3), and at least one of n1 and n2 is an integer of 1 or more depending on the type of the ring Z. That is, n1 and n2 are not both 0. Each of the numbers of substitutions n1 and n2 is, for example, an integer of 1 to 4, preferably an integer of 1 to 3, and more preferably an integer of 1 or 2, and particularly may be 1. The numbers of substitutions n1 and n2 may be the same or different in each ring Z, and at least one of n1 and n2 corresponding to the number of substitution of the substituent containing a radical polymerizable group may be an integer of 1 or more (for example, an integer of 1 to 3, particularly 1 or 2).

In embodiments, $X_1$ may be a radical polymerizable group, $X_2$ may be a radical polymerizable group or a hydrogen atom, and n1 and n2 may be 1. The polymerizable groups $X_1$ and $X_2$ are preferably an allyl group, a (meth)acryloyl group, and particularly a polymerizable group represented by the general formula (2c).

The group $[X—(OR^1)m-]$ can substitute at a suitable position on the ring Z. For example, when the ring Z is a benzene ring, the group $[X—(OR^1)m-]$ may substitute at the 2-, 3-, and/or 4-position(s) (particularly at the 3-position and/or the 4-position) of the phenyl group. When the ring Z is a naphthalene ring, the group may substitute at the 5-, 6-, 7-, and/or 8-position(s) of the naphthyl group, and more specifically, the 1-position or the 2-position of the naphthalene ring substitutes at the 9-position of fluorene (substitution in 1-naphthyl or 2-naphthyl relationship) and for this substitution position, the group [X—(OR$^1$)m-] may substitute in 1,5-position relationship, 2,6-position relationship, or other relationship (especially in 2,6-position relationship when n is 1) (n represents $n_1$ or $n_2$; the same applies hereinafter).

When n is 2 or more, the substitution position is not particularly limited. On the ring assembly arene ring Z, the substitution position of the group [X—(OR$^1$)m-] is not particularly limited, and for example, the group may substitute on an arene ring bonded to the 9-position of fluorene and/or an arene ring adjacent to the arene ring bonded to the 9-position of fluorene. For example, the 3- or 4-position of the biphenyl ring Z may be bonded to the 9-position of fluorene, and when the 4-position of the biphenyl ring Z is bonded to the 9-position of fluorene, the substitution position of the group [X—(OR$^1$)m-] may be any of the 2-, 3-, 2'-, 3'-, and 4'-positions and the group may substitute at the 2-, 3'-, and 4'-positions, preferably at the 2- and 4'-positions (particularly at the 2-position).

In the general formula (1), $R^4$ is a substituent.

Examples of the substituent $R^4$ include a halogen atom (for example, a fluorine atom, a chlorine atom, a bromine atom, and an iodine atom); an alkyl group (a linear or branched $C_{1-10}$ alkyl group such as a methyl group, an ethyl group, a propyl group, an isopropyl group, a butyl group, a s-butyl group, and a t-butyl group, preferably a linear or branched $C_{1-6}$ alkyl group, and more preferably a linear or branched $C_{1-4}$ alkyl group); a cycloalkyl group (a $C_{5-10}$ cycloalkyl group such as a cyclopentyl group or a cyclohexyl group); an aryl group (a phenyl group, an alkylphenyl group (a methylphenyl (tolyl) group, a dimethylphenyl (xylyl) group, and the like), a $C_{6-12}$ aryl group such as a biphenyl group and a naphthyl group); an aralkyl group (a $C_{6-10}$ aryl-$C_{1-4}$ alkyl group such as benzyl group and phenethyl group); an alkoxy group (for example, a linear or branched $C_{1-10}$ alkoxy group such as a methoxy group, an ethoxy group, a propoxy group, a n-butoxy group, an isobutoxy group, a t-butoxy group); a cycloalkoxy group (for example, $C_{5-10}$ cycloalkyloxy group such as cyclohexyloxy group); an aryloxy group (for example, a $C_{6-10}$ aryloxy group such as a phenoxy group); an aralkyloxy group (for example, a $C_{6-10}$ aryl-$C_{1-4}$ alkyloxy group such as a benzyloxy group); an alkylthio group (for example, a $C_{1-10}$ alkylthio group such as a methylthio group, an ethylthio group, a propylthio group, a n-butylthio group, and a t-butylthio group); a cycloalkylthio group (for example, a $C_{5-10}$ cycloalkylthio group such as a cyclohexylthio group); an arylthio group (for example, a $C_{6-10}$ arylthio group such as a thiophenoxy group); an aralkylthio group (for example, a $C_{6-10}$ aryl-$C_{1-4}$ alkylthio group such as a benzylthio group); an acyl group (for example, a $C_{1-6}$ acyl group such as acetyl group); a carboxy group; an alkoxycarbonyl group (for example, a $C_{1-4}$ alkoxycarbonyl group such as a methoxycarbonyl group); a nitro group; a cyano group; a dialkylamino group (for example, a di $C_{1-4}$ alkylamino group such as a dimethylamino group); and a dialkylcarbonylamino group (for example, a di-$C_{1-4}$ alkylcarbonylamino group such as a diacetylamino group).

Representative examples of these substituents $R^4$ include a halogen atom, an alkyl group, a cycloalkyl group, an aryl group, an aralkyl group, an alkoxy group, an acyl group, a carboxy group, a nitro group, a cyano group, and a substituted amino group. Preferable examples of the substituent $R^4$ include a linear or branched $C_{1-4}$ alkyl group such as an alkoxy group, an alkyl group, particularly a methyl group. When the substituent $R^4$ is an aryl group, the substituent $R^4$ may form a ring assembly arene ring together with the ring Z. The substituents $R^4$ may be the same or different in the same or different rings Z.

In general formula (1), p indicates the number of substitution and is an integer of 0, 1, or more.

The number of the substitution number p may be selected depending on the type of the ring Z, and is, for example, an integer of 0 to 8, preferably an integer of 0 to 4, more preferably 0 to 3 (for example, 0 to 2). Typically, p may be 0 or 1. When p is 1, the ring Z may be a benzene ring, a naphthalene ring, or a biphenyl ring and the substituent $R^4$ may be a methyl group.

In the general formula (1), $R^5$ represents a substituent.

Examples of the substituent $R^5$ include a cyano group, a halogen atom (a fluorine atom, a chlorine atom, a bromine atom, and the like), a carboxy group, an alkoxycarbonyl group (for example, a $C_{1-4}$ alkoxycarbonyl group such as a methoxycarbonyl group), an alkyl group (a $C_{1-6}$ alkyl group such as a methyl group, an ethyl group, a propyl group, an isopropyl group, a butyl group, and a t-butyl group), and an aryl group (a $C_{6-10}$ aryl group such as a phenyl group). Preferable examples of the substituent $R^5$ include an alkyl group, a carboxy group or a $C_{1-2}$ alkoxycarbonyl group, a cyano group, a halogen atom, and a linear or branched $C_{1-4}$ alkyl group such as particularly a methyl group.

In general formula (1), k indicates the number of substitution and is an integer of 0 to 4.

The substitution number k is an integer of 0 to 4 (for example, 0 to 3), preferably an integer of 0 to 2 (for example, 0 or 1), and particularly 0. The numbers of substitution k may be the same or different, and when k is 2 or more, the substituents $R^5$ may be the same or different and the substituents $R^5$ substituting on the two benzene rings of the fluorene ring may be the same or different. The substitution position of the substituent $R^5$ is not particularly limited, and may be, for example, the 2-position to the 7-position (such as the 2-position, the 3-position and/or the 7-position) of the fluorene ring.

Representative examples of the polymerizable fluorene compound represented by the general formula (1) are shown as follows.

Examples of the compound when k=0, p=0, n1 and n2=1, and $X_1$ and $X_2$ are polymerizable groups (3-carboxyacryloyl group) include 9,9-bis(4-(3-carboxyacryloyloxy) phenyl) fluorene, 9,9-bis(3-methyl-4-(3-carboxyacryloyloxy)phenyl)fluorene, 9,9-bis(3,4-di(3-carboxyacryloyloxy)phenyl) fluorene, 9,9-bis(6-(3-carboxyacryloyloxy)-2-naphthyl) fluorene, 9,9-bis(4-phenyl-3-(3-carboxyacryloyloxy) phenyl)fluorene, 9,9-bis[4-(2-(3-carboxyacryloyloxy) ethoxy)phenyl]fluorene, 9,9-bis[3-methyl-4-(2-(3-carboxyacryloyl oxy)ethoxy)phenyl]fluorene, 9,9-bis[6-(2-(3-carboxyacryloyloxy)ethoxy)-2-naphthyl]fluorene, and 9,9-bis[4-phenyl-3-(2-(3-carboxyacryloyl oxy)ethoxy)phenyl]fluorene.

Examples of the compound when k=0, p=0, n1 and n2=1, $X_1$ is a polymerizable group (3-carboxyacryloyl group), and $X_2$ is a hydrogen atom include 9-(4-(3-carboxyacryloyloxy) phenyl)-9-(4-hydroxyphenyl)fluorene, 9-(3-methyl-4-(3-carboxyacryloyloxy)phenyl)-9-(3-methyl-4-hydroxyphenyl)fluorene, 9-(3,4-di(3-carboxyacryloyloxy)phenyl)-9-(3,4-dihydroxyphenyl)fluorene, 9-(6-(3-carboxyacryloyl oxy)-2-naphthyl)-9-(6-hydroxy-2-naphthyl)fluorene, 9-(4-phenyl-3-(3-carboxyacryloyloxy)phenyl)-9-(4-phenyl-3-hydroxyphenyl)fluorene, 9-[4-(2-(3-carboxyacryloyloxy) ethoxy)phenyl]-9-[4-(2-hydroxyethoxy)phenyl]fluorene, 9-[3-methyl-4-(2-(3-carboxyacryloyloxy)ethoxy)phenyl]-9-[3-methyl-4-(2-hydroxyethoxy)phenyl]fluorene, 9-[6-(2-(3-carboxyacryloyloxy)ethoxy)-2-naphthyl]-9-[6-(2-hydroxyethoxy)-2-naphthyl]fluorene, and 9-[4-phenyl-3-(2-(3-carboxyacryloyloxy)ethoxy)phenyl]-9-[4-phenyl-3-(2-hydroxyethoxy)phenyl]fluorene.

In the fluorene-modified cellulose nanofiber, the ratio of the polymerizable fluorene compound bonded to the cellulose fiber may be selected from the range of about 0.01 to 20% by mass based on the total amount of the fluorene-modified cellulose nanofiber, and is, for example, 0.05 to 15% by mass, preferably 0.1 to 10% by mass (for example, 0.3 to 7% by mass), and more preferably 0.5 to 5% by mass (for example, 0.7 to 3% by mass).

The average fiber diameter of the fluorene-modified cellulose nanofiber may be, for example, 1 to 1000 nm, preferably 4 to 500 nm, and more preferably about 10 to 200 nm.

The average fiber length of the fluorene-modified cellulose nanofiber may be selected from the range of about 0.01 to 500 µm, and may be, for example, typically 1 µm or more, preferably 10 µm or more, and more preferably 30 µm or more.

The ratio of the average fiber length to the average fiber diameter (i.e., aspect ratio) of the fluorene-modified cellulose nanofiber is, for example, 5 to 10000.

The saturated water absorption of the fluorene-modified cellulose nanofiber is, for example, 8% by mass or less (for example, 5% by mass or less). For example, when the fluorene-modified cellulose nanofiber is put under the conditions of a temperature of 25° C. and a humidity of 60% for 1 day, it has a moisture content of 0 to 7% by mass (for example, 0 to 5% by mass), preferably 5% by mass or less (for example, 0.1 to 5% by mass), and further preferably about 3% by mass or less.

The crystallinity of the fluorene-modified cellulose nanofiber may be, for example, 40 to 95% (for example, 50 to 90%), preferably 60 to 95% (for example, 65 to 90%), and more preferably about 70 to 90% (for example, 75 to 85%), and may be typically 60% or more (for example, about 75 to 90%).

The content of the fluorene-modified cellulose nanofiber in the rubber composition is 1.5 to 30 parts by mass, preferably 2 to 30 parts by mass, and more preferably 2.5 to 30 parts by mass per 100 parts by mass of the rubber component. The content of 1.5 parts by mass or more improves the stiffness of the rubber composition. The content of 30 parts by mass or less reduces deterioration of elongation properties of the rubber composition. The fluorene-modified cellulose nanofibers described above may be used alone or in combinations of two or more.

When the rubber composition is used to produce a hose containing an ethylene propylene diene rubber as a rubber component, the content of the fluorene-modified cellulose nanofiber is preferably 1.5 to 25 parts by mass per 100 parts by mass of the rubber component. When the rubber composition is used to produce an air cleaner hose containing an ethylene propylene diene rubber as a rubber component, the content of the fluorene-modified cellulose nanofiber is preferably 1.5 to 20 parts by mass per 100 parts by mass of the rubber component.

When the rubber composition is used to produce an air cleaner hose containing a chloroprene rubber as a rubber component, the content of the fluorene-modified cellulose nanofiber is preferably 1.5 to 9 parts by mass per 100 parts by mass of the rubber component.

<Carbon-Based Filler>

Examples of the carbon-based filler (or carbon-material filler) include carbon black, carbon fibers, petroleum coke, graphite, and carbon nanotubes.

These carbon-based fillers may be used alone or in combinations of two or more.

The average particle diameter (median diameter) of the carbon-based filler is, for example, 0.4 nm to 100 µm.

The content of the carbon-based filler in the rubber composition is 30 to 120 parts by mass, and preferably 60 to 120 parts by mass per 100 parts by mass of the rubber component. When the content of the carbon-based filler is in the above range, the effect of the fluorene-modified cellulose nanofiber on improving the stiffness may be enhanced.

<Process Oil>

The rubber composition preferably further comprises a process oil.

The process oil is not particularly limited, and any known process oil may be used. Examples of the known process oil include paraffin oil, naphthene oil, and aromatic hydrocarbon oil.

These process oils may be used alone or in combinations of two or more.

The content of the process oil in the rubber composition is preferably 12 to 60 parts by mass per 100 parts by mass of the rubber component.

<Other Components>

The rubber composition can contain other components than the rubber component, the fluorene-modified cellulose nanofiber, the carbon-based filler, and the process oil. Examples of the other components include a vulcanizing agent, a vulcanization accelerator, an antioxidant, a processing aid, a filler, a softening agent, an acid acceptor, a colorant, and an anti-scorch agent.

Examples of the vulcanizing agent include sulfur, a sulfur compound, a metal soap such as calcium stearate, thiazole, a sulfenamide, a dithiocarbamate, a sulfur-based organic compound, a peroxide, and an amine compound. The content of the vulcanizing agent in the rubber composition is, for example, 1 to 15 parts by mass per 100 parts by mass of the rubber component.

Examples of the vulcanization accelerator include zinc oxide, a thiuram vulcanization accelerator, a dithiocarbamate vulcanization accelerator, a thiazole vulcanization accelerator, and a sulfenamide vulcanization accelerator. The content of the vulcanization accelerator in the rubber composition is, for example, 1 to 20 parts by mass per 100 parts by mass of the rubber component.

In addition, the other components include a clay. Addition of a clay to the rubber composition may reduce the content of the carbon-based filler required to obtain a desired stiffness. Therefore, when a lower carbon-based filler content is desired, a clay is preferably added. A rubber composition having a lower carbon-based filler content may be required when, for example, the rubber composition is used as a component being in contact with a metal product, such as a weather strip for a car. In this case, the electrical resistance of the rubber composition is improved by the reduced content of the carbon-based filler, allowing electric corrosion of a metal product in contact with the rubber composition to be suppressed.

Examples of the clay include a clay composed mainly of hydrated aluminum silicate such as montmorillonite, pyrophyllite, kaolinite, halloysite, and sericite. Clays can be classified into hard clays and soft clays based on the particle diameter distribution. Hard clays have 80% by mass or more of particles having a particle diameter of 2 µm or less. Soft clays have 60% by mass or less of particles having a particle diameter of 2 μm or less. Both a hard clay and a soft clay can be used, but it is more preferable to use a hard clay. The shape of the clay particles is not particularly limited, but flat clay particles are preferable. These clays may be used alone or in combinations of two or more.

The content of the clay in the rubber composition is preferably 30 to 150 parts by mass and more preferably 60 to 150 parts by mass per 100 parts by mass of the rubber component. The clay is preferably added when the content of the carbon-based filler is 110 parts by mass or less per 100 parts by mass of the rubber component. From the viewpoint of improving the electrical resistance of the rubber composition, the content of the carbon-based filler is preferably 70 parts by mass or less and more preferably 60 parts by mass or less per 100 parts by mass of the rubber component.

Molded rubber products may be required to have both sufficient stiffness and elongation properties. For example, air cleaner hoses are required to have a stiffness for withstanding the intake negative pressure acting on the hose, whereas also required to have elongation properties allowing some deformation in order to absorb vibration of the engine. However, the stiffness and the elongation properties of the rubber composition are antinomic, and it is difficult to obtain both at the same time.

The rubber composition according to the above-described embodiments can improve the stiffness while reducing or preventing deterioration of the elongation properties.

The configurations and effects of the rubber compositions of various embodiments are described as follows.

(1) The rubber composition contains: at least one rubber component selected from the group consisting of an ethylene propylene diene rubber, a chloroprene rubber, a nitrile rubber, and an acrylic rubber; 1.5 to 30 parts by mass of a fluorene-modified cellulose nanofiber per 100 parts by mass of the rubber component; and 30 to 120 parts by mass of a carbon-based filler per 100 parts by mass of the rubber component.

According to the configuration, the fluorene-modified cellulose nanofiber improves the stiffness of the rubber composition. Furthermore, the effect of the fluorene-modified cellulose nanofiber on improving the stiffness may be considerably enhanced by the carbon-based filler. The assumed mechanism is that a bonding structure is formed between the carbon-based filler and the fluorene-modified cellulose nanofiber, which causes improvement of the stiffness of the rubber composition.

Due to the improved stiffness with the combination use of the fluorene-modified cellulose nanofiber and the carbon-based filler, the content of the fluorene-modified cellulose nanofiber required for obtaining the desired stiffness is reduced. This can reduce or prevent deterioration of the elongation properties of the rubber composition caused by a high content of the fluorene-modified cellulose nanofiber.

(2) A hose made of the rubber composition contains an ethylene propylene diene rubber as the rubber component and 1.5 to 25 parts by mass of the fluorene-modified cellulose nanofiber per 100 parts by mass of the rubber component.

According to the configuration, a hose excellent in elongation properties and stiffness may be obtained.

(3) An air cleaner hose made of the rubber composition contains an ethylene propylene diene rubber as the rubber component and 1.5 to 20 parts by mass of the fluorene-modified cellulose nanofiber per 100 parts by mass of the rubber component.

According to the configuration, an air cleaner hose excellent in elongation properties and stiffness may be obtained.

(4) An air cleaner hose made of the rubber composition contains a chloroprene rubber as the rubber component and 1.5 to 9 parts by mass of the fluorene-modified cellulose nanofiber per 100 parts by mass of the rubber component.

According to the configuration, an air cleaner hose excellent in elongation properties and stiffness may be obtained.

(5) The rubber composition may contain 30 to 150 parts by mass of a clay per 100 parts by mass of the rubber component.

According to the configuration, the content of the carbon-based filler required for obtaining the desired stiffness may be reduced. This may improve the electrical resistance of the rubber composition by suppressing the content of the carbon-based filler and readily provide the desired stiffness.

(6) A weather strip made of the rubber composition contains 30 to 150 parts by mass of a clay per 100 parts by mass of the rubber component.

According to the configuration, a weather strip excellent in stiffness and elongation properties and having a high electrical resistance may be obtained.

Other embodiments of the rubber composition that can be grasped from the above embodiments will be described as follows.

(i) The rubber composition further containing 12 to 60 parts by mass of a process oil per 100 parts by mass of the rubber component.

(ii) The rubber composition wherein the fluorene-modified cellulose nanofiber is a cellulose fiber modified with a polymerizable monomer grafted thereto, and the polymerizable monomer includes a compound having a 9,9-bisarylfluorene skeleton represented by the following general formula (1):

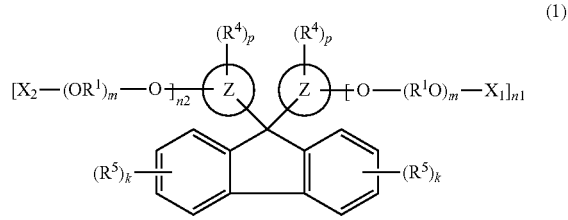

(1)

wherein the ring Z is an arene ring; $R^1$ is an alkylene group; m is an integer of 0, 1, or more; $X_1$ and $X_2$ are a radical polymerizable group or a hydrogen atom, at least one of $X_1$ and $X_2$ is a radical polymerizable group; n1 and n2 are an integer of 0, 1, or more, at least one of n1 and n2 corresponding to the substituent number of the substituent containing the radical polymerizable group is an integer of 1 or more; $R_4$ and $R_5$ are substituents; p is an integer of 0, 1, or more; and k is an integer of 0 to 4.

II. Method of Producing Rubber Composition

Hereinafter, embodiments of the method of producing the rubber composition will be described in detail.

The method is based on the finding that in the production of a rubber composition containing a fluorene-modified cellulose nanofiber and a process oil, the stiffness of the obtained rubber composition is further improved when a dispersion of the fluorene-modified cellulose nanofiber in the process oil is mixed with the rubber component.

The rubber composition containing the fluorene-modified cellulose nanofiber and the process oil is produced by a method comprising a dispersing step, a kneading step, and a mixing step described below.

Dispersing Step

The dispersing step is a step of preparing a dispersion of a fluorene-modified cellulose nanofiber in a process oil.

The process oil and the fluorene modified cellulose nanofiber are combined and mixed by a known mixer such as an emulsifying disperser to prepare the dispersion. The content of the fluorene-modified cellulose nanofiber in the dispersion is, for example, 1.0 to 10% by mass.

Details of the process oil and the fluorene-modified cellulose nanofiber are as described above with respect to the embodiments of the rubber composition and thus not reproduced here.

Kneading Step

The kneading step is a step of kneading the dispersion obtained in the dispersing step, a carbon-based filler, and a rubber component to prepare a kneaded material.

The dispersion and the carbon-based filler are combined and left for a predetermined period of time so that the dispersion penetrates between the carbon-based filler particles. The content of the carbon-based filler in the dispersion is, for example, 1 to 90% by mass.

The dispersion combined with the carbon-based filler and the rubber component are kneaded using a known kneading machine such as a Banbury mixer to prepare the kneaded material.

With respect to the blending ratio of the dispersion combined with the carbon-based filler to the rubber component, the dispersion is preferably blended with the rubber component so that the amount of the fluorene-modified cellulose nanofiber is 1.5 to 30 parts by mass per 100 parts by mass of the rubber component. Preferably, the dispersion is blended so that the amount of the carbon-based filler is 3 to 120 parts by mass per 100 parts by mass of the rubber component.

Details of the rubber component and the carbon-based filler are as described above with respect to the embodiments of the rubber composition and thus not reproduced here.

The kneaded material may contain other components such as an antioxidant, a processing aid, a filler, a softening agent, an acid acceptor, a coloring agent, and/or a scorch inhibitor as required.

Mixing Step

The mixing step is a step of mixing a vulcanizing agent and a vulcanization accelerator as required with the kneaded material obtained in the kneading step. The mixing step can be performed using a known mixer such as an emulsifying disperser. At an appropriate timing after the mixing step, a molding step and the vulcanization step are performed to obtain a rubber composition having a predetermined shape. The molding step includes, for example, extrusion, injection molding, or press forming. The vulcanization step can be performed using a known vulcanizer.

The vulcanizing agent may be added in an amount of 1 to 15 parts by mass per 100 parts by mass of the rubber component.

The vulcanization accelerator may be added in an amount of 1 to 20 parts by mass per 100 parts by mass of the rubber component.

Details of the vulcanizing agent and the vulcanization accelerator are as described above with respect to the embodiments of the rubber composition and thus not reproduced here.

Through these steps, the rubber composition containing the fluorene-modified cellulose nanofiber and the process oil is obtained.

The rubber composition is applied to, for example, a molded rubber product such as a vehicle part. Examples of the vehicle part include a hose such as an air cleaner hose, a brake hose, a reservoir hose and a water hose, and a weather strip.

The configurations and effects of the method according to the embodiments are described as follows.

(1) A method of producing a rubber composition comprises: kneading a dispersion of a fluorene-modified cellulose nanofiber in a process oil and a rubber component to prepare a kneaded material; and mixing a vulcanizing agent into the kneaded material.

According to the configuration, a rubber composition having a higher stiffness can be obtained as compared with the case where the process oil and the fluorene-modified cellulose nanofiber are separately added and kneaded with the rubber component. The mechanism is believed to be as follows.

By mixing the rubber component with the fluorine-modified cellulose nanofiber in the state of a dispersion in the process oil, aggregation of the fluorene-modified cellulose nanofiber during kneading is reduced or prevented. This improves the dispersibility of the fluorene-modified cellulose nanofiber in the rubber composition and enhances the effect of the fluorene-modified cellulose nanofiber on improving the stiffness.

(2) In addition to the dispersion and the rubber component, a carbon-based filler may be kneaded in the kneading step. According to the configuration, the stiffness of the rubber composition may be further improved. The carbon-based filler may be mixed with the dispersion before it is kneaded with the rubber component.

The embodiments may be modified as follows. The embodiments and the following modifications can be performed in combination to the extent that they do not contradict each other.

In the case that the dispersion of the fluorene-modified cellulose nanofiber in the process oil is commercially available, the dispersing step may be omitted.

The rubber composition may be produced without using the carbon-based filler.

EXAMPLES

Examples of the rubber composition will be described more specifically with reference to Test Examples.

<Test 1>

Changes in the stiffness of the rubber composition when using a carbon-based filler and a fluorene-modified cellulose nanofiber in combination were evaluated.

A rubber component, a fluorene-modified cellulose nanofiber, a carbon-based filler, other fillers, and a process oil were mixed according to the compositions (parts by mass) shown in the rows headed by "Composition" in Table 1 and Table 2 and further mixed with 4.5 parts by mass, in total, of a vulcanizing agent and a vulcanization accelerator. The resulting mixtures were formed into a sheet to obtain molded rubber samples of Test Examples 1 to 8. The details of each component are as follows.

Rubber component: ethylene propylene diene rubber ("Mitsui EPT3045" manufactured by Mitsui Chemicals, Inc.).

Fluorene-modified cellulose nanofiber: fluorene-modified cellulose nanofiber of Example 1 of Japanese Patent Application Laid-open No. 2017-222777.

Carbon-based filler: carbon black ("Seast G116" manufactured by Tokai Carbon Co., Ltd.).

Other filler: kaolin ("Crown Clay" manufactured by Active Minerals international LLC).

Other filler: calcium carbonate ("Whiton B" manufactured by Shiraishi Calcium Kaisha, Ltd.).

Process oil: paraffin oil ("Diana Process Oil PW-380" manufactured by Idemitsu Kosan Co., Ltd.).

Vulcanizing agent: sulfur fine powder of 325 mesh.

Vulcanization accelerator: dithiocarbamate-based vulcanization accelerator ("Nocceler BZ" manufactured by Ouchi Shinko Chemical Industrial Co., Ltd), sulfenamide-based vulcanization accelerator ("Nocceler CZ" manufactured by Ouchi Shinko Chemical Industrial Co., Ltd), thiuram-based vulcanization accelerator ("Nocceler TT" manufactured by Ouchi Shinko Chemical Industrial Co., Ltd).

In Tables 1 and 2, "EPDM" means the ethylene propene diene rubber, and "FCNF" means the fluorene-modified cellulose nanofiber.

Next, dumbbell-shaped test pieces (dumbbell shape No. 5 type: 2 mm width) were cut out from the molded rubber samples of Test Examples 1 to 8 and subjected to a tensile test according to JIS K 6251 to calculate M10. The results are shown in Table 1 and Table 2. M10 is a tensile force at 10% elongation of the test piece and is a parameter corresponding to the stiffness of the rubber composition of the test piece.

TABLE 1

| | | Test Example 1 | Test Example 2 | Test Example 3 | Test Example 4 |
|---|---|---|---|---|---|
| Composition | Rubber component (EPDM) | 100 | 100 | 100 | 100 |
| | FCNF | 0 | 3 | 0 | 3 |
| | Carbon-based filler | 60 | 60 | 0 | 0 |
| | Other filler (kaolin) | 0 | 0 | 60 | 60 |
| | Process oil | 30 | 30 | 30 | 30 |
| Evaluation | M10 (MPa) | 0.49 | 1.80 | 0.25 | 0.44 |

TABLE 2

| | | Test Example 5 | Test Example 6 | Test Example 7 | Test Example 8 |
|---|---|---|---|---|---|
| Composition | Rubber component (EPDM) | 100 | 100 | 100 | 100 |
| | FCNF | 0 | 3 | 0 | 3 |
| | Carbon-based filler | 60 | 60 | 0 | 0 |
| | Other filler (calcium carbonate) | 0 | 0 | 60 | 60 |
| | Process oil | 12 | 12 | 12 | 12 |
| Evaluation | M10 (MPa) | 0.71 | 2.48 | 0.29 | 0.42 |

As shown in Tables 1 and 2, Test Examples 4 and 8, which contain other fillers and the fluorene-modified cellulose nanofiber, showed only 1.5 to 1.8-fold increases in the M10 value compared to Test Examples 3 and 7, which contain other fillers but not the fluorene-modified cellulose nanofiber.

In contrast, Test Examples 2 and 6, which contain the carbon-based filler and the fluorene-modified cellulose nanofiber, showed large increases of about 3.5-fold in the M10 value compared to Test Examples 1 and 5, which contain the carbon-based filler but not the fluorene-modified cellulose nanofiber. These results indicate that the effect of the fluorene-modified cellulose nanofiber on improving the stiffness is strongly enhanced when the carbon-based filler is contained together.

<Test 2>

Changes in the stiffness and the elongation properties of the rubber composition when using both a carbon-based filler and a fluorene-modified cellulose nanofiber were evaluated.

A rubber component, a fluorene-modified cellulose nanofiber, a carbon-based filler, and a process oil were mixed according to the compositions (parts by mass) shown in the rows headed by "Composition" in Table 3 and further mixed with 4.5 parts by mass, in total, of a vulcanizing agent and a vulcanization accelerator. The resulting mixtures were formed into a sheet to obtain molded rubber samples of Test Examples 9 to 14. The details of each component are the same as in Test 1.

Next, test pieces (dumbbell shape No. 5 type: 2 mm width) were cut out from the molded rubber samples of Test Examples 9 to 14 and subjected to a tensile test according to JIS K 6251 to calculate M10 and Eb. The results are shown in Table 3. Eb is percent of elongation of the test piece at break (maximum elongation percent at break) and is a parameter corresponding to the elongation properties of the rubber composition of the test piece.

TABLE 3

| | | Test Example 9 | Test Example 10 | Test Example 11 | Test Example 12 | Test Example 13 | Test Example 14 |
|---|---|---|---|---|---|---|---|
| Composition | Rubber component (EPDM) | 100 | 100 | 100 | 100 | 100 | 100 |
| | FCNF | 0.5 | 1.0 | 3 | 5 | 15 | 30 |
| | Carbon-based filler | 60 | 60 | 60 | 60 | 60 | 60 |
| | Process oil | 60 | 60 | 60 | 60 | 60 | 60 |
| Evaluation | M10 (MPa) | 0.37 | 0.44 | 0.95 | 1.31 | 2.19 | 2.52 |
| | Eb (%) | 614 | 613 | 544 | 542 | 308 | 180 |

As shown in Table 3, as the content of the fluorene-modified cellulose nanofiber increased, the Eb value (elongation properties) decreased. However, since the effect of the fluorene-modified cellulose nanofiber on improving the stiffness was enhanced by the carbon-based filler, Test Examples 11 to 14, in which the content of the fluorene-modified cellulose nanofiber was within the range of 1.5 to 30 parts by mass, showed an elongation percent Eb of 100% or more and a high stiffness represented by M10 of 0.5 MPa or more.

<Test 3>

An existing rubber composition for air cleaner hoses containing other components such as an antioxidant was evaluated for stiffness and elongation properties after addition of a carbon-based filler and a fluorene-modified cellulose nanofiber.

A carbon-based filler and a fluorene-modified cellulose nanofiber were added to an existing rubber composition for air cleaner hoses to have the compositions shown in the rows headed by "Composition" in Tables 4 and 5. The resulting mixtures were formed into a sheet to obtain molded rubber samples of Test Examples 15 to 20.

In Table 5, "CR" means a chloroprene rubber.

As in Test 2, test pieces were cut out from the molded rubber samples of Test Examples 15 to 20 and subjected to a tensile test according to JIS K 6251 to calculate M10 and Eb. The results are shown in Tables 4 and 5.

TABLE 4

|  |  | Test Example 15 | Test Example 16 | Test Example 17 |
|---|---|---|---|---|
| Composition | Rubber component (EPDM) | 100 | 100 | 100 |
|  | FCNF | 2.2 | 8.4 | 14.1 |
|  | Carbon-based filler | 120 | 120 | 120 |
|  | Process oil | 50 | 50 | 50 |
| Evaluation | M10 (MPa) | 1.20 | 2.63 | 6.33 |
|  | Eb (%) | 208 | 173 | 117 |

TABLE 5

|  |  | Test Example 18 | Test Example 19 | Test Example 20 |
|---|---|---|---|---|
| Composition | Rubber component (CR) | 100 | 100 | 100 |
|  | FCNF | 3 | 6.4 | 10.6 |
|  | Carbon-based filler | 69.5 | 69.5 | 69.5 |
|  | Process oil | 0 | 0 | 0 |
| Evaluation | M10 (MPa) | 2.05 | 4.88 | 6.32 |
|  | Eb (%) | 280 | 240.0 | 105 |

As shown in Tables 4 and 5, the high stiffness (M10 of 0.5 MPa or more) and the high elongation properties (Eb of 100% or more) provided by the addition of the carbon-based filler and the fluorene-modified cellulose nanofiber were also achieved in the existing rubber composition for air cleaner hoses.

<Test 4>

An existing rubber composition for hoses other than air cleaner hoses was evaluated for stiffness and elongation properties after addition of a carbon-based filler and a fluorene-modified cellulose nanofiber.

A carbon-based filler and a fluorene-modified cellulose nanofiber were added to an existing rubber composition for break hoses to have the compositions shown in the rows headed by "Composition" in Table 6. The resulting mixtures were formed into a sheet to obtain molded rubber samples of Test Examples 21 to 23.

A carbon-based filler and a fluorene-modified cellulose nanofiber were added to an existing rubber composition for reservoir hoses to have the compositions shown in the rows headed by "Composition" in Table 7. The resulting mixtures were formed into a sheet to obtain molded rubber samples of Test Examples 24 to 26.

A carbon-based filler and a fluorene-modified cellulose nanofiber were added to an existing rubber composition for water hoses to have the compositions shown in the rows headed by "Composition" in Table 8. The resulting mixtures were formed into a sheet to obtain molded rubber samples of Test Examples 27 to 29.

TABLE 6

|  |  | Test Example 21 | Test Example 22 | Test Example 23 |
|---|---|---|---|---|
| Composition | Rubber component (EPDM) | 100 | 100 | 100 |
|  | FCNF | 3.3 | 5.9 | 9.8 |
|  | Carbon-based filler | 61.1 | 61.1 | 61.1 |
|  | Process oil | 0 | 0 | 0 |
| Evaluation | M10 (MPa) | 1.50 | 2.86 | 4.63 |
|  | Eb (%) | 236 | 235 | 203 |

As shown in Table 6, the high stiffness (M10 of 0.5 MPa or more) and the high elongation properties (Eb of 100% or more) provided by the addition of the carbon-based filler and the fluorene-modified cellulose nanofiber were also achieved in the existing rubber composition for break hoses.

TABLE 7

|  |  | Test Example 24 | Test Example 25 | Test Example 26 |
|---|---|---|---|---|
| Composition | Rubber component (EPDM) | 100 | 100 | 100 |
|  | FCNF | 3 | 5.4 | 9 |
|  | Carbon-based filler | 58 | 58 | 58 |
|  | Process oil | 3 | 3 | 3 |
| Evaluation | M10 (MPa) | 1.11 | 2.03 | 4.03 |
|  | Eb (%) | 282 | 262 | 211 |

As shown in Table 7, the high stiffness (M10 of 0.5 MPa or more) and the high elongation properties (Eb of 100% or more) provided by the addition of the carbon-based filler and the fluorene-modified cellulose nanofiber were also achieved in the existing rubber composition for reservoir hoses.

TABLE 8

|  |  | Test Example 27 | Test Example 28 | Test Example 29 |
|---|---|---|---|---|
| Composition | Rubber component (EPDM) | 100 | 100 | 100 |
|  | FCNF | 3 | 12.5 | 20.9 |
|  | Carbon-based filler | 88 | 88 | 88 |
|  | Other filler | 118 | 118 | 118 |
|  | Process oil | 87.5 | 87.5 | 87.5 |
| Evaluation | M10 (MPa) | 1.06 | 3.04 | 4.48 |
|  | Eb (%) | 526 | 381 | 189 |

As shown in Table 8, the high stiffness (M10 of 0.5 MPa or more) and the high elongation properties (Eb of 100% or more) provided by the addition of the carbon-based filler and the fluorene-modified cellulose nanofiber were also achieved in the existing rubber composition for water hoses.

<Test 5>

Changes in the stiffness, the electrical resistance and the elongation properties of the rubber composition when using a carbon-based filler, a clay and a fluorene-modified cellulose nanofiber together were evaluated.

A rubber component, a fluorene-modified cellulose nanofiber, a carbon-based filler, calcium carbonate, a clay and a process oil were mixed according to the compositions (parts by mass) shown in the rows headed by "Composition" in Table 9 and further mixed with 5.1 parts by mass, in total, of a vulcanizing agent and a vulcanization accelerator. The resulting mixtures were formed into a sheet to obtain molded rubber samples of Test Examples 30 to 33. The details of each component are as follows.

Rubber component: ethylene propene diene rubber ("NE130" manufactured by JSR Corporation).

Fluorene-modified cellulose nanofiber: fluorene-modified cellulose nanofiber of Example 1 of Japanese Patent Application Laid-open No. 2017-222777.

Carbon-based filler: carbon black ("Asahi #60UGS" manufactured by Asahi Carbon Co., Ltd.).

Calcium carbonate: "Whiton B" manufactured by Shiraishi Calcium Kaisha, Ltd.

Clay: kaoline ("Crown Clay" manufactured by Active Minerals international LLC).

Process oil: "P-400" manufactured by JXTG Nippon Oil & Energy Corporation.

Vulcanizing agent: sulfur fine powder of 325 mesh.

Vulcanization accelerator: dithiocarbamate-based vulcanization accelerator ("Nocceler BZ" manufactured by Ouchi Shinko Chemical Industrial Co., Ltd), sulfenamide-based vulcanization accelerator ("Nocceler MSA-G" manufactured by Ouchi Shinko Chemical Industrial Co., Ltd), thiuram-based vulcanization accelerator ("Nocceler TT" manufactured by Ouchi Shinko Chemical Industrial Co., Ltd).

Next, M10 and Eb of Test Examples 30 to 33 were calculated in the same way as Test 1 and Test 2. The results are shown in Table 9. Further, test pieces were cut out from the molded rubber samples of Test Examples 30 to 33 and tested for the volume specific resistance p according to JIS K 6911. The results are shown in Table 9.

TABLE 9

|  |  | Test Example 30 | Test Example 31 | Test Example 32 | Test Example 33 |
|---|---|---|---|---|---|
| Composition | Rubber component (EPDM) | 100 | 100 | 100 | 100 |
|  | FCNF | 0 | 2.5 | 0 | 0 |
|  | Carbon-based filler | 132 | 57 | 57 | 57 |
|  | Calcium carbonate | 45 | 0 | 0 | 125 |
|  | Clay | 0 | 125 | 125 | 0 |
|  | Process oil | 24 | 54 | 54 | 54 |
| Evaluation | M10 (MPa) | 2.25 | 2.36 | 1.21 | 0.52 |
|  | Eb (%) | 220 | 370 | 460 | 580 |
|  | ρ (Ωcm) | $1.26 \times 10^3$ | $1.40 \times 10^7$ | $1.10 \times 10^7$ | $6.60 \times 10^6$ |

Test Example 30 is an exemplary existing rubber composition for weather strips. In Test Example 31, the content of the carbon-based filler was reduced to less than one-half compared to Test Example 30 by replacing calcium carbonate and a part of the carbon-based filler with a clay and adding a fluorene-modified cellulose nanofiber.

As shown in Table 9, Test Example 31 showed equal or superior stiffness compared to Test Example 30 in spite of having less than one-half the content of the carbon-based filler. Furthermore, Test Example 31 showed a considerably increased value of the volume specific resistance p, which represents electrical resistance, and Eb compared to Test Example 30. These results show that the content of the carbon-based filler required for obtaining the desired stiffness can be reduced by adding a clay and a fluorene-modified cellulose nanofiber, resulting in a higher electrical resistance. The results also show that the addition of the clay does not adversely affect the improvement of the elongation properties.

Test Example 32 corresponds to Test Example 31 except for the absence of the fluorene-modified cellulose nanofiber. Test Example 33 corresponds to Test Example 30, which is an existing composition for weather strips, except that a part of the carbon-based filler was replaced with calcium carbonate. Test Examples 32 and 33 failed to achieve stiffness comparable to Test Example 30. These results indicate that in order to obtain the desired stiffness while reducing the content of a carbon-based filler, simple replacement of the carbon-based filler with other fillers such as calcium carbonate is insufficient and addition of a fluorene-modified cellulose nanofiber and replacement of the carbon-based filler with a clay are required.

Examples of the method of producing the rubber composition will be described more specifically with reference to Test Examples.

Test Example 34

A dispersion was prepared by mixing 60 parts by mass of a process oil and 3 parts by mass of a fluorene-modified cellulose nanofiber. The 63 parts by mass of the dispersion was then mixed with 60 parts by mass of a carbon-based filler so that the dispersion penetrates between the carbon-based filler particles.

The 123 parts by mass of the dispersion mixed with the carbon-based filler and 100 parts by mass of a rubber component were kneaded using a Banbury mixer to form a kneaded material.

Next, 1.5 parts by mass of a vulcanizing agent and 3 parts by mass (in total) of three vulcanization accelerators were mixed into the kneaded material. The resulting mixture was formed into a sheet to obtain a molded body. The molded body was then vulcanized to prepare a rubber composition of Test Example 34.

The following materials were used as ingredients of the rubber composition.

Rubber component: ethylene propene diene rubber ("Mitsui EPT3045" manufactured by Mitsui Chemicals, Inc.).

Fluorene-modified cellulose nanofiber: fluorene-modified cellulose nanofiber of Example 1 of Japanese Patent Application Laid-open No. 2017-222777.

Carbon-based filler: carbon black ("Seast G116" manufactured by Tokai Carbon Co., Ltd.).

Process oil: paraffin oil ("Diana Process Oil PW-380" manufactured by Idemitsu Kosan Co., Ltd.).

Vulcanizing agent: sulfur fine powder of 325 mesh.

Vulcanization accelerator: dithiocarbamate-based vulcanization accelerator ("Nocceler BZ" manufactured by Ouchi Shinko Chemical Industrial Co., Ltd), sulfenamide-based vulcanization accelerator ("Nocceler CZ" manufactured by Ouchi Shinko Chemical Industrial Co., Ltd), thiuram-based vulcanization accelerator ("Nocceler TT" manufactured by Ouchi Shinko Chemical Industrial Co., Ltd).

The composition of the rubber composition of Test Example 34 is shown in Table 10. In Table 10, "EPDM" means an ethylene propylene diene rubber, and "FCNF" means a fluorene-modified cellulose nanofiber.

Test Example 35

Sixty parts by mass of a process oil and 60 parts by mass of a carbon-based filler were mixed so that the process oil penetrates between the carbon-based filler particles. The 120 parts by mass of the process oil mixed with the carbon-based filler and 100 parts by mass of a rubber component were kneaded using a Banbury mixer to form a kneaded material. Next, 1.5 parts by mass of a vulcanizing agent and 3 parts by mass (in total) of three vulcanization accelerators were mixed into the kneaded material. The resulting mixture was formed into a sheet to obtain a molded body. The molded body was then vulcanized to prepare a rubber composition of Test Example 35. The composition of the rubber composition of Test Example 35 is shown in Table 10. The ingredients of the rubber composition used were the same as Test Example 34.

Test Example 36

Sixty parts by mass of a process oil and 60 parts by mass of a carbon-based filler were mixed so that the process oil penetrates between the carbon-based filler particles. The 120 parts by mass of the process oil mixed with the carbon-based filler, 100 parts by mass of a rubber component and 3 parts by mass of fluorene-modified cellulose nanofiber were kneaded using a Banbury mixer to form a kneaded material. Next, 1.5 parts by mass of a vulcanizing agent and 3 parts by mass (in total) of three vulcanization accelerators were mixed into the kneaded material. The resulting mixture was formed into a sheet to obtain a molded body. The molded body was then vulcanized to prepare a rubber composition of Test Example 36. The composition of the rubber composition of Test Example 36 is shown in Table 10. The ingredients of the rubber composition used were the same as Test Example 34.

(Evaluation Test)

Test pieces (dumbbell-shaped No. 5 type: 2 mm width) were cut out from the rubber compositions of Test Examples 34, 35, and 36. The test pieces were subjected to a tensile test according to JIS K 6251. The results are shown in Table 10.

TABLE 10

|  |  | Test Example 34 | Test Example 35 | Test Example 36 |
|---|---|---|---|---|
| Composition | Rubber component (EPDM) | 100 | 100 | 100 |
|  | Carbon-based filler | 60 | 60 | 60 |
|  | FCNF | 3 | 0 | 3 |
|  | Process oil | 60 | 60 | 60 |
|  | Vulcanizing agent | 1.5 | 1.5 | 1.5 |
|  | Vulcanization accelerator | 3 | 3 | 3 |
| Evaluation | M10 (MPa) | 1.49 | 0.28 | 0.97 |

As shown in Table 10, in both Test Example 34 and Test Example 36 in which the fluorene-modified cellulose nanofiber was blended, the M10 value was increased compared to Test Example 35 in which the fluorene-modified cellulose nanofiber was not blended, but there was as much as a 1.5-fold difference in the M10 values between Test Example 34 and Test Example 36. This result indicates that the effect of the fluorene-modified cellulose nanofiber on improving stiffness is further enhanced when the fluorene-modified cellulose nanofiber is added as a dispersion in the process oil to the rubber component compared to when the fluorene-modified cellulose nanofiber is directly mixed with the rubber component.

Various changes in the form and the details may be made to the examples above without departing from the spirit and scope of the claims and their equivalents. The examples are for the sake of description only, and not for purposes of limitation.

Descriptions of features in each example are to be considered as being applicable to similar features or aspects in other examples. Suitable results may be achieved if sequences are performed in a different order, and/or if components in a described composition are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A rubber composition comprising:
   at least one rubber component selected from the group consisting of an ethylene propylene diene rubber, a chloroprene rubber; a nitrite rubber, and an acrylic rubber;
   1.5 to 30 parts by mass of a fluorene-modified cellulose nanofiber per 100 parts by mass of the rubber component; and
   30 to 120 parts by mass of a carbon-material filler per 100 parts by mass of the rubber component.

2. The rubber composition according to claim 1, comprising 30 to 150 parts by mass of a clay per 100 parts by mass of the rubber component.

3. A weather strip comprising the rubber composition according to claim 1.

4. A hose comprising the rubber composition according to claim 1.

5. The hose according to claim 4,
   wherein the rubber component is an ethylene propylene diene rubber; and
   the hose comprises 1.5 to 25 parts by mass of the fluorene-modified cellulose nanofiber per 100 parts by mass of the rubber component.

6. The hose according to claim 4,
   wherein the rubber component is an ethylene propylene diene rubber;
   the hose comprises 1.5 to 20 parts by mass of the fluorene-modified cellulose nanofiber per 100 parts by mass of the rubber component; and
   the hose is an air cleaner hose.

7. The hose according to claim 4,
   wherein the rubber component is a chloroprene rubber;
   the hose comprises 1.5 to 9 parts by mass of the fluorene-modified cellulose nanofiber per 100 parts by mass of the rubber component; and
   the hose is an air cleaner hose.

8. A method of producing a rubber composition, the method comprising:
   kneading a dispersion of a fluorene-modified cellulose nanofiber in a process oil and a rubber component to prepare a kneaded material; and
   mixing a vulcanizing agent into the kneaded material.

9. The method according to claim 8, wherein the rubber component comprises at least one of an ethylene propylene rubber, a chloroprene rubber, a nitrile rubber, and an acrylic rubber.

10. The method according to claim 8, wherein the kneading further comprises kneading a carbon-material filler with the dispersion and the rubber component.

11. The method according to claim 8, wherein a content of the fluorene-modified cellulose nanofiber in the dispersion is 1.0 to 10% by mass.

12. The method according to claim 10, wherein the kneading further comprises mixing the carbon-material filler with the dispersion before kneading with the rubber component.

* * * * *